(12) United States Patent
Bazer-Bachi et al.

(10) Patent No.: US 9,156,738 B2
(45) Date of Patent: Oct. 13, 2015

(54) PREPARATION OF A SOLID BASED ON ZINC OXIDE FOR USE IN PURIFYING A GAS OR A LIQUID

(75) Inventors: Delphine Bazer-Bachi, Saint-Genis-Laval (FR); David Chiche, Lyons (FR); Joseph Lopez, Saint Julien les Rosiers (FR); Marc Antoine Lelias, Ales (FR)

(73) Assignee: IFP ENERGIES NOUVELLES, Rueil-Malmaison Cedex (FR)

( * ) Notice: Subject to any disclaimer, the term of this patent is extended or adjusted under 35 U.S.C. 154(b) by 820 days.

(21) Appl. No.: 13/144,197

(22) PCT Filed: Dec. 3, 2009

(86) PCT No.: PCT/FR2009/001374
§ 371 (c)(1),
(2), (4) Date: Sep. 20, 2011

(87) PCT Pub. No.: WO2010/079264
PCT Pub. Date: Jul. 15, 2010

(65) Prior Publication Data
US 2012/0000855 A1    Jan. 5, 2012

(30) Foreign Application Priority Data

Jan. 12, 2009  (FR) ..................................... 09 00106

(51) Int. Cl.
*B01J 20/22* (2006.01)
*C04B 35/453* (2006.01)
(Continued)

(52) U.S. Cl.
CPC .............. *C04B 35/453* (2013.01); *B01D 53/02* (2013.01); *B01J 20/0244* (2013.01); *B01J 20/06* (2013.01); *B01J 20/2803* (2013.01); *B01J 20/3007* (2013.01); *B01J 20/3042* (2013.01); *C04B 35/6263* (2013.01); *C04B 35/62635* (2013.01); *C04B 35/6303* (2013.01); *C04B 35/6316* (2013.01); *C04B 35/6365* (2013.01); *C04B 35/63416* (2013.01); *C04B 35/63444* (2013.01); *B01D 2253/112* (2013.01); *B01D 2257/20* (2013.01); *B01D 2257/304* (2013.01); *B01D 2257/308* (2013.01); *C04B 2235/3201* (2013.01);
(Continued)

(58) Field of Classification Search
USPC .................................................. 502/340–343
See application file for complete search history.

(56) References Cited

U.S. PATENT DOCUMENTS 2,435,379 A * 2/1948 Archibald ......................... 502/8
4,088,736 A   5/1978 Courty et al.
(Continued)

FOREIGN PATENT DOCUMENTS

EP            0 401 789 A1    12/1990

OTHER PUBLICATIONS
International Search Report of PCT/FR2009/001374 (Jan. 27, 2010).

*Primary Examiner* — Melvin C Mayes
*Assistant Examiner* — Kenneth Vaden
(74) *Attorney, Agent, or Firm* — Millen, White, Zelano & Branigan, P.C.

(57) ABSTRACT

The invention concerns a process for preparing a solid comprising ZnO and a binder comprising the following steps: pre-mixing powders comprising at least one ZnO powder and at least one binder (step a), mixing the paste obtained (step b), extruding (step c) the paste obtained in step b), drying the extrudates, and calcining (step d) in a stream of gas comprising oxygen.

8 Claims, 1 Drawing Sheet

(51) Int. Cl.

| | |
|---|---|
| *B01D 53/02* | (2006.01) |
| *B01J 20/02* | (2006.01) |
| *B01J 20/06* | (2006.01) |
| *B01J 20/28* | (2006.01) |
| *B01J 20/30* | (2006.01) |
| *C04B 35/626* | (2006.01) |
| *C04B 35/63* | (2006.01) |
| *C04B 35/634* | (2006.01) |
| *C04B 35/636* | (2006.01) |

(52) U.S. Cl.
CPC . *C04B 2235/3217* (2013.01); *C04B 2235/3218* (2013.01); *C04B 2235/3284* (2013.01); *C04B 2235/349* (2013.01); *C04B 2235/5409* (2013.01); *C04B 2235/606* (2013.01); *C04B 2235/6021* (2013.01); *C04B 2235/6584* (2013.01)

(56) References Cited

U.S. PATENT DOCUMENTS

| | | | |
|---|---|---|---|
| 4,923,843 A * | 5/1990 | Saforo et al. | 502/415 |
| 5,143,706 A | 9/1992 | Schubert | |
| 5,178,843 A | 1/1993 | Delzer et al. | |
| 5,219,542 A | 6/1993 | Lowery et al. | |
| 5,348,924 A * | 9/1994 | Potter et al. | 502/66 |
| 5,597,540 A | 1/1997 | Akita et al. | |
| 6,174,511 B1 * | 1/2001 | Tsukada et al. | 423/628 |
| 6,177,002 B1 * | 1/2001 | Glover | 208/64 |
| 2010/0154295 A1 * | 6/2010 | Bazer-Bachi et al. | 44/411 |

* cited by examiner

PREPARATION OF A SOLID BASED ON ZINC OXIDE FOR USE IN PURIFYING A GAS OR A LIQUID

The present invention relates to the field of capture masses or absorbants and also to that of the purification of gas and liquid effluents such as liquid hydrocarbon feeds, natural gas, synthesis gas containing, inter alia, sulphur-containing impurities such as $H_2S$, COS and/or $CS_2$, or halogenated impurities such as HCl. In the remainder of the text, and for the purposes of simplification, the terms "capture mass", "adsorbant" or "solid" are used interchangeably to denote said material.

More precisely, the invention relates to a process for preparing a capture mass based on ZnO in several steps. The solid obtained is in the form of extruded particles containing at least ZnO as well as at least one binder. The preparation mode of the invention means that the solids obtained have very good mechanical strength properties, which are adapted for use in a fixed bed, as well as improved sulphur absorption and HCl capacities.

PRIOR ART

Synthesis gas can conventionally be obtained by transforming natural gas, coal, heavy oil residues or biomass using processes such as steam reforming, autothermal reforming or partial oxidation, or by the decomposition of methanol. Synthesis gas may also be obtained by gasification of mixtures of biomass and/or coal and/or petroleum residues (synthesis gas obtained by co-processing).

The gas is generally a mixture comprising carbon monoxide, hydrogen, water vapour and carbon dioxide. Depending on the type of feed from which it is obtained, synthesis gas contains varying quantities of impurities such as sulphur-containing compounds, for example, such as $H_2S$, COS and/or $CS_2$, as well as halogens such as chlorine in the HCl form.

Sulphur-containing impurities and HCl present in unpurified synthesis gas may cause accelerated corrosion of the units in which they are used, such as gas turbines in synthesis gas/electricity co-generation units (IGCC, integrated gasification combined cycle). Further, gas from a co-generation unit must generally satisfy very specific specifications linked to demands placed on the downstream processes. Sulphur-containing compounds as well as halogenated compounds are the constituents which are most frequently encountered; they have to be eliminated efficiently.

Such impurities also have a tendency to poison the catalysts employed in Fischer-Tropsch synthesis processes, for example, or in chemical synthesis processes such as methanol synthesis processes, or to attenuate the performances of the materials used in fuel cells.

To this end, demands placed on the gas as regards purity are very strict. Thus, such sulphur-containing and halogenated impurities must be eliminated, in addition to other types of impurities which also have to be eliminated so that the gas contains no more than residual amounts thereof. Certain applications, such as the Fischer-Tropsch synthesis, for example, require contents which are generally less than 10 ppb by weight for each constituent.

The $H_2S$ present in natural gas, sometimes in an amount of 20% by volume, is generally eliminated using Claus type processes. Following such treatment, in the natural gas there are generally quantities of $H_2S$ which may be non-negligible depending on the envisaged application (natural gas reforming for the production of hydrogen or synthesis gas, for example).

Liquid feeds such as hydrocarbons used, for example, as a feed for catalytic reforming units, isomerization units or hydrogenation units contain sulphur-containing impurities such as $H_2S$ as well as COS and $CS_2$ which have to be eliminated in order to protect the catalysts employed in the units in which they are used. Environmental constraints also require that those impurities be eliminated.

The impurities also include HCl present in naphthas and gas from reforming units, sometimes in an amount of 20 ppm by weight.

The use of a solid such as an adsorbant or a capture mass is one of the techniques in routine use in the purification of gas or liquid. In that technique, in the case of sulphur-containing compounds, the impurities to be eliminated interact chemically with the metal oxides contained in the capture mass to form a sulphide. The solids used as a capture mass include, for example, oxides based on copper, zinc, magnesium, iron or manganese. Alumina and silica may be used as a support or binder.

Patent FR-2 295 782 B1 provides a solid mass for use in the absorption of hydrogen sulphide ($H_2S$) and, if appropriate, sulphur and carbon oxysulphide ($CS_2$, COS), said mass containing 20% to 85% by weight of zinc oxide, calculated as ZnO, 0.9% to 50% of alumina, calculated as $Al_2O_3$, and 2% to 45% of an oxide of a metal from group IIA, calculated as the oxide. It is prepared by mixing a zinc compound, at least one aluminium compound and at least one compound of a metal from group IIA, preferably a calcium compound. The solid mass described in that patent has a sufficient mechanical strength for ZnO contents of up to 80% by weight; beyond this content, the mechanical strength becomes too low and does not allow fixed bed use.

U.S. Pat. No. 4,071,609 describes a method for preparing a capture mass composed exclusively of ZnO. The particles constituting the mass are obtained by granulation starting from a powder of zinc oxide and water, without adding a binder, granulation resulting in the formation of ZnO agglomerates which are then converted into basic zinc carbonate by treatment in a stream of $CO_2$. The carbonate formed thereby is finally decomposed by a heat treatment in air, at a temperature in the range 200° C. to 500° C., to result in the formation of ZnO, the heat treatment providing the particles with an increased specific surface area and mechanical strength.

Further, patents FR-2 718 658 B1 and U.S. Pat. No. 5,866, 503 describe pellets of absorbant comprising a mixture of a reactive metal oxide which may be zinc oxide, an inert metal oxide diluent, a silica with a high specific surface area and a binder. The quantity of zinc oxide in the pellets is generally in the range 30% by weight to 60% to 65% by weight. Further, these capture masses are used in the form of pellets at a minimum desulphurization temperature of 426° C. for the French patent, and 315° C. for the American patent.

Regarding dehalogenation (elimination of halogenated compounds) in general, capture masses such as solids based on dolomite, zeolites, basic aluminas or aluminas treated with alkali metals, or zinc oxides, are routinely used. Aluminas treated, for example, with alkalis, alkaline-earths, rare earths and/or transition metals, are currently most widely used for gas purification.

SUMMARY OF THE INVENTION

The preparation process of the invention can produce solids based on ZnO which may be used for desulphurization and/or elimination of halogenated compounds from gaseous and liquid feeds. In particular, the solids obtained in accordance with said process have good properties as regards mechanical strength, even in the case of solids wherein the ZnO content is more than 85% by weight.

One single preparation method may thus be used regardless of the ZnO content, which allows solids with good mechanical strength to be obtained, which can thus be used in a fixed bed.

The process of the invention comprises at least the following steps:
a) pre-mixing powders comprising at least one ZnO powder and at least one binder, for example in a mixer, by rotating the arms of the mixer;
b) mixing a paste obtained by:
   i) bringing the pre-mixed powders and a solution containing a peptizing agent into contact, leading to the production of a paste (peptization);
   ii) mixing the paste;
c) extruding the paste obtained in step b) at a pressure in the range 3 to 10 MPa;
d) drying the extrudates obtained in step c) at a temperature in the range 70° C. to 160° C. for a period in the range 1 to 24 hours;
e) calcining the dried extrudates at a temperature in the range 200° C. to 800° C. for a period in the range 1 to 6 hours, in a gaseous stream comprising oxygen.

Said preparation process can produce solids with enhanced sulphur capacities, which may advantageously be used to desulphurize any gas or liquid feed comprising $H_2S$. They can also eliminate COS and/or $CS_2$ which may be present. The solids obtained using said process with a ZnO content of more than 85% by weight are particularly suitable for said use.

In particular, the solid obtained may be used, for example, to purify natural gases, synthesis gas used in chemical synthesis processes, Fischer-Tropsch synthesis processes, co-generation units, as well as liquid hydrocarbons.

Another advantage of the solid of the invention is that it has a high sulphurization capacity from 150° C., and thus can purify a synthesis gas to a very great extent under advantageous conditions since they are identical in terms of pressure, temperature and flow rate to those used in the Fischer-Tropsch unit located downstream. Further, the prepared solid may optionally be regenerated after use.

Further, the process of the invention can produce solids with an improved halogenated compound elimination capacity (for example dechlorination capacity) from low temperatures, i.e. from 20° C., and can thereby purify a gas or a liquid under conditions which are representative of a gas or a liquid at the outlet from a stabilization column of a catalytic reformer. In this case, a solid with a ZnO content in the range 30% by weight to 95% by weight, preferably in the range 40% by weight to 90% by weight, may advantageously be used.

DETAILED DESCRIPTION

The invention provides a process for preparing a solid based on zinc oxide which can eliminate sulphur-containing and halogenated impurities from a gas, comprising the following steps:
a) pre-mixing powders comprising at least one ZnO powder and at least one binder;
b) mixing a paste obtained by:
   i) bringing the pre-mixed powders and a solution containing a peptizing agent into contact, leading to the production of a paste (peptization);
   ii) mixing the paste;
c) extruding the paste obtained in step b) at a pressure in the range 3 to 10 MPa;
d) drying the extrudates obtained in step c) at a temperature in the range 70° C. to 160° C. for a period in the range 1 to 24 hours;
e) calcining the dried extrudates at a temperature in the range 200° C. to 800° C. for a period in the range 1 to 6 hours, in a gaseous stream comprising oxygen.

Said solid based on zinc oxide in the form of extruded particles comprises at least:
- 30% by weight to 98% by weight, preferably 40% by weight to 97% by weight, more preferably 60% by weight to 95% by weight, and still more preferably in the range 85% to 95% by weight of ZnO;
- 1% by weight to 70% by weight, preferably 3% by weight to 60% by weight, more preferably 5% by weight to 40% by weight and still more preferably 5% by weight to 15% by weight of a binder.

These contents, as a % by weight, are expressed with respect to the total weight of the solid prepared using the process of the invention.

The process for preparing the solid in accordance with the invention can produce solids the mechanical strength of which, measured by the average crush strength test (ACS), is 0.9 daN·mm$^{-1}$ or more regardless of the quantity of ZnO employed.

Further, the solids obtained have improved desulphurization performances as regards the treatment of gas and liquids containing the compounds $H_2S$, COS and $CS_2$.

In particular, said solids have a sulphur capacity before breakthrough, measured using a breakthrough test carried out with a gas composed of 0.9% of $H_2S$ in hydrogen, at a temperature of 200° C., at atmospheric pressure, with an hourly space velocity of 2600 h$^{-1}$, of more than 0.06 grams of sulphur per gram of solid, or 0.08 or even 0.10 grams of sulphur per gram of solid, and advantageously more than 0.12 grams of sulphur per gram of solid.

Further, the solids prepared using the process of the invention have improved performances as regards the elimination of halogenated compounds, in particular as regards the treatment of gas and liquids containing hydrogen chloride or hydrochloric acid (HCl). In particular, said solids have a chlorine capacity, also measured by a breakthrough test with a gas composed of 500 ppm by volume of $H_2O$ and 500 ppm by volume of HCl in nitrogen, at a temperature of 30° C., at atmospheric pressure, with an hourly space velocity (HSV) of 1600 h$^{-1}$, of more than 0.08 g of chlorine per gram of solid, or even 0.10 g of chlorine per gram of solid, or even more than 0.20 g of chlorine per gram of solid, and advantageously more than 0.25 g of chlorine per gram of solid.

Regarding the use of the solid prepared using the process of the invention in a desulphurization process, the ZnO content of said solid is preferably in the range 60% by weight to 95% by weight, and more preferably in the range 85% by weight to 95% by weight of ZnO.

Regarding the use of the solid prepared using the process of the invention in a dehalogenation process, the ZnO content of said solid is preferably in the range 30% by weight to 98% by weight, more preferably in the range 40% by weight to 80% by weight, and more preferably in the range 50% by weight to 70% by weight of ZnO.

Source of ZnO

Commercially available sources of ZnO generally derive from two major industrial processes used to manufacture zinc oxide: the indirect or French process, and the direct or American process.

Initially preferred, the French process consists basically of heating zinc to close to its boiling point. The vapour generated thereby is oxidized by combustion in air. Zinc bloom is drawn in by fans and sent to large chambers where the particles are classified using screens according to their size. That process results in products with a very high purity the quality of which depends only on the initial purity of the metal.

The origin of the direct process goes back to 1852 (The New Jersey Zinc Company). In this case, the raw material is zinc ore, i.e. usually zinc sulphides, carbonates or silicates. This ore, mixed with coal, is charged into a furnace in which a stream of air is circulated. The heat from combustion of the coal reduces the ore and volatilizes the zinc. The vapour is then oxidized by carbonic anhydride or oxygen which is provided in excess. As in the French process, the oxide fumes are drawn up and fed into vast spaces to recover particles which are classified by size. Although it is cheaper, that process, however, results in a less pure zinc oxide.

Many other methods for preparation have been described in the literature: as an example, by dehydrating zinc hydroxide obtained by precipitation, or by decomposing various zinc precursors; they may be commercially available or obtained by preliminary precipitation.

Commercially available zinc oxides may be used in the manufacture of the solid or capture mass of the invention. The zinc oxide powders used for the manufacture of the solid of the invention normally have a specific surface area (determined by nitrogen adsorption-desorption) in the range approximately 10 to 80 $m^2/g$, usually in the range 30 to 60 $m^2/g$.

Binder:

During manufacture of the solid of the invention, the ZnO powder is associated with at least one binder in order to allow said solid to be shaped and to provide it with good mechanical strength.

The proportion of binder employed during manufacture is 60% by weight or less (expressed on the basis of the total dry matter) and depends on the target application, preferably 5% by weight or less.

Regarding the application of the solid of the invention to a desulphurization process, the quantity of binder for the particles is preferably in the range 1% by weight to 15% by weight.

Regarding the application of the solid of the invention to a dehalogenation process, the quantity of binder for the particles is preferably in the range 20% to 60% by weight, and more preferably in the range 30% to 50% by weight.

The solid of the invention comprises at least one binder. It is possible to use binders which are well known to the skilled person; advantageously, for example, selected from an alumina or an alumina precursor, which is preferably boehmite, silica or a clay such as a kaolinite, a montmorillonite, a bentonite or a smectite. It is entirely possible to combine a binder of the "alumina" type and a binder of the "clay" type. In accordance with a preferred mode for manufacturing the solid of the invention, the binder is a kaolinite type clay, for example clay from Provins.

Preparation Process:

The solid prepared using the process of the invention is obtained by bringing at least one ZnO powder, a binder and a solution containing a peptizing agent into contact in accordance with a particular process.

Thus, the invention concerns a process for preparing a solid comprising ZnO and a binder, in which said process comprises the following steps:

a) pre-mixing powders comprising at least one ZnO powder and at least one binder;
b) mixing a paste obtained by:
   i) bringing the pre-mixed powders and a solution containing a peptizing agent into contact, leading to the production of a paste (peptization);
   ii) mixing the paste;
c) extruding the paste obtained in step b) at a pressure in the range 3 to 10 MPa;
d) drying the extrudates obtained in step c) at a temperature in the range 70° C. to 160° C. for a period in the range 1 to 24 hours;
e) calcining the dried extrudates at a temperature in the range 200° C. to 800° C. for a period in the range 1 to 6 hours, in a gaseous stream comprising oxygen.

Description of Step a):

Step a) consists of mixing powders, preferably dry, for example in a mixer or in any other type of mixing device. This step, preferably carried out without adding liquid, can produce a homogeneous mixture of powdered constituents.

Description of Step b):

Step b) consists of bringing the powders which have been pre-mixed in step a) into contact with a solution containing a peptizing agent. This step, which produces a paste, is intended to peptize the constituents.

Step b), which comprises peptization, may be carried out in accordance with two variations of the present invention, which differ in the constitution of the solution employed during said step.

In accordance with a first variation of the preparation process of the invention, peptization is advantageously carried out using a solution containing a basic peptizing agent in order to allow:
   dispersion of the constituents, ZnO and the binder(s);
   partial dissolution of the constituents;
   a consequent reduction in the size of the ZnO crystals present in the solid.

Preferably, this first variation is operated in the absence of a doping agent. The term "dopant" means a mineral element which can be adsorbed onto the surface of ZnO particles and/or be incorporated into the crystalline structure of the ZnO.

Under the action of the aqueous solution containing the basic peptizing agent, the phenomena of dispersion and dissolution of binder particles and ZnO operating during the mixing step by bringing the various constituents into contact are encouraged. Without wishing to be restrictively bound to a particular theory, it is, however, possible to hypothesize that better dispersion both of the ZnO and of the particles of binder will tend to improve the final mechanical strength obtained for said preparation process.

Further, the use of a basic peptizing agent during preparation of the solids containing ZnO used for desulphurization of gaseous or liquid feeds is particularly advantageous. In fact, it has been observed that using a basic peptizing agent for the production of solid in accordance with this application can result in a substantial increase in the sulphur capacities of the solids used for desulphurization, compared with prior art solids.

In the context of the invention, in accordance with the first variation peptization is carried out using a basic aqueous solution containing an inorganic base such as sodium hydroxide, potassium hydroxide, ammonia, or using a solution containing an organic base such as an amine, or a quaternary ammonium compound selected, for example, from alkylethanolamines and ethoxylated alkylamines. In accordance with an advantageous preparation mode, the inorganic base is sodium hydroxide.

In this case, the pH of the solution used (measured at ambient temperature) is more than 8, preferably more than 10, more preferably more than 12. These pH values are generally obtained by employing a ratio of the quantity of base/quantity of ZnO in the range 1% to 10% by weight, preferably in the range 2% to 8% by weight.

In accordance with a second variation of the preparation process of the invention, peptization is advantageously carried out using a solution containing an acidic or basic peptizing agent and at least one dopant.

The term "dopant" means a mineral element which can be adsorbed onto the surface of ZnO particles and/or be incorporated into the crystalline structure of ZnO. Dopants may, for example, be alkali or alkaline-earth ions, or belong to the transition metal series. Preferably, the dopant is an alkali or alkaline-earth ion and more preferably, the dopant is the sodium ion, $Na^+$.

In the context of the invention, peptization is advantageously carried out in order to allow:
dispersion of the constituents, ZnO and the binder(s);
partial dissolution of the constituents;
doping of the active material, in this case the zinc oxide in accordance with the present invention, for the purposes of absorption of sulphur-containing and halogenated compounds.

Conventionally and in accordance with the prior art, a single peptizing agent is used during shaping of the mass. In the context of the invention, peptization is preferably carried out using an aqueous solution containing both a peptizing agent and a compound containing a mineral doping element or using a compound with a dual doping/peptization effect. In accordance with one advantageous preparation mode, the composition of sodium hydroxide means that it acts both as a peptizing agent and as a dopant, since the element $Na^+$ is then supplied by the sodium hydroxide peptizing agent in the system. This is also the case for mineral bases which allow the same effects.

The combined action of the peptizing agent and dopant means that the phenomena of dispersion and dissolution of particles of binder and ZnO operating during the mixing step by bringing the various constituents into contact are encouraged. Without wishing to be restrictively bound to a particular theory it is, however, possible to hypothesize that better dispersion both of ZnO and of particles of binder will tend to improve the mechanical strength and the sulphur and chlorine capacities finally obtained in said preparation process and constituting the capture mass of the invention.

The mineral doping element is generally introduced into the aqueous solution used for dispersion and peptization of the constituent ZnO and binder(s) during mixing. The quantity of doping mineral element introduced into the final particles is generally in the range 0.1% to 10% by weight with respect to the dry mass of ZnO employed, preferably in the range 0.5% to 6% by weight.

In the context of the second variation, peptization of the constituent ZnO and binder(s) may be carried out in an acid medium, the acid usually being nitric acid, but it may also be hydrochloric acid or any other acid which is known to the skilled person, for example an inorganic acid such as hydrofluoric acid, hydrobromic acid, hydrochloric acid, nitric acid, nitrous acid, sulphonic acid, sulphuric acid, perchloric acid, or an organic mono- or di-carboxylic acid such as acetic acid, propionic acid or butanoic acid.

Peptization may also be carried out in a basic medium using a solution containing an inorganic base such as sodium hydroxide, potassium hydroxide, ammonia or using a solution containing an organic base such as an amine, or a quaternary ammonium compound selected, for example, from alkylethanolamines and ethoxylated alkylamines.

In accordance with an advantageous mode for manufacturing a capture mass in accordance with the invention, peptization is carried out using an aqueous acid solution containing nitric acid. The pH of the solution (measured at ambient temperature) is preferentially less than 5, preferably less than 3. These pH values are generally obtained using a ratio of the quantity of $HNO_3$/quantity of ZnO in the range 1% to 10% by weight, preferably in the range 2% to 6%.

In accordance with another advantageous mode for manufacturing the solid of the invention, peptization is carried out using a basic aqueous solution. In this case, the pH of the solution (measured at ambient temperature) is more than 8, preferably more than 10, more preferably more than 12. These pH values are generally obtained using a ratio of the quantity of base/quantity of ZnO in the range 1% to 8% by weight, preferably in the range 2% to 8% by weight.

The quantity of liquid solution employed is adjusted so as to obtain, at the end of the peptization and regardless of the variation employed, a paste which does not flow but which is also not too dry in order to allow extrusion during step c) under suitable pressure conditions which are well known to the skilled person and depend on the extrusion equipment used. In general, the extrusion pressure is more than 1 MPa, preferably in the range 3 MPa to 10 MPa.

The reagents (ZnO, binder, aqueous solution containing peptizing agent and dopant) are brought into contact by mixing, either in a batch or continuous process.

For batch mixing, the skilled person will know, for example, to use a mixer equipped with a Z arm, roller arm or cam arm, but any other mixing equipment may also be used.

The powders (ZnO and binder) are initially pre-mixed before introducing the aqueous solution containing the basic peptizing agent. Whatever the zinc oxide or binder is, it is entirely possible to mix several sources of ZnO and/or binder of the clay or alumina type.

Further, during mixing, it is possible to incorporate one or more extrusion adjuvants, in order thereby to improve the flow of the paste in the die during extrusion. These adjuvants, which are well known to the skilled person, may, for example, be selected from mono-carboxylic aliphatic acids, alkylated aromatic compounds, sulphonic acid salts, fatty acids, polyvinylpyridine, polyvinyl alcohol, and methyl cellulose.

These adjuvants are generally added in an amount in the range 1% to 20% by weight, preferably in the range 2% to 10% by weight, based on the total mass of the constituents introduced into the mixer.

The mixing period is generally in the range 5 to 60 min, preferably in the range 20 to 50 min. The rotation speed of the arms of the mixer is in the range 10 to 75 rpm, preferably in the range 25 to 50 rpm.

Description of Step c):

After the mixing step, the paste is extruded, for example in a piston extruder, which may be single screw or twin screw.

In the case of a continuous preparation mode, mixing may be coupled with extrusion in the same equipment. In this implementation, the mixed paste may be extruded either by extruding directly from the end of a continuous twin screw type mixer, for example, or by connecting one or more batch mixers to an extruder. The geometry of the die, which provides the extrudates with their shape, may be selected from dies which are well known to the skilled person. They may thus, for example, be cylindrical, trilobed, quadrilobed, channeled or slotted in shape.

Description of Step d)

The extrudates obtained are then dried at a temperature which is generally in the range 70° C. to 160° C. for a period of between 1 and 24 h. Drying can advantageously be carried out in air or, as is preferable, in moist air.

Description of Step e)

The extrudates obtained are then treated in a stream of gas comprising oxygen, for example and preferably calcined in air, or treated at temperature in the presence of a gas mixture comprising an inert gas (for example nitrogen) and oxygen. The gas mixture used preferably comprises at least 5% by volume of oxygen, or more preferably at least 10% by volume.

The temperature of said treatment is generally in the range 200° C. to 800° C., more preferably in the range 300° C. to 600° C., for a period in the range 1 to 6 h, preferably in the range 2 to 4 h.

Following calcining, the extrudates have a diameter in the range 1 to 5 mm, preferably in the range 1.5 to 3.5 mm.

Since the solid of the invention is obtained by extrusion, the shape of the particles is close to that of a cylindrical bar but this does not exclude them subsequently, for example, being introduced into a piece of equipment that can round their surface, such as a pelletizer or any other equipment which can render them spherical.

Properties of Prepared Solids

Their mechanical properties are determined using the average crush strength test described by the ASTM method D 4179-88a. This consists of measuring the breaking force of each particle of a representative sample comprising at least 50 particles. The result is weighted by the length of the extrudate.

The ACS value is the mean of the measured breaking forces in terms of the unit length of the extrudate (expressed in daN·mm$^{-1}$) for all of the particles of the sample.

In the case of the capture mass of the invention, the ACS value is more than 0.9 daN·mm$^{-1}$ (decaNewton per millimeter of extrudate length), preferably more than 1.0 daN·mm$^{-1}$.

The sulphur capacity of the solid of the invention is measured by a breakthrough test the conditions of which are described below. The test is carried out at a temperature of 200° C., at atmospheric pressure, and with an hourly space velocity (HSV) of 2600 h$^{-1}$. The gas used for the test contains 0.9% H$_2$S and 50 ppm by volume of COS in hydrogen. The quantities of H$_2$S and COS present in the gas leaving the reactor which contains the capture mass used for the test, are determined by gas chromatography.

Figure 1:
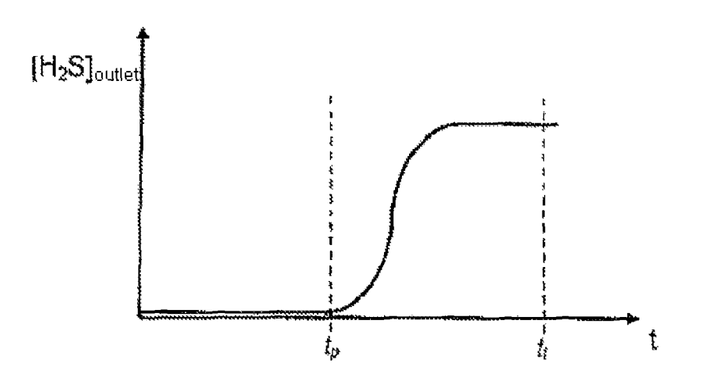
FIG. 1 shows the sulphur capacity of a solid of the invention.

The sulphur capacity of the solids of the invention is determined by carrying out a material balance. The sulphurization capacity as defined in the context of the present invention corresponds to the quantity of sulphur accumulated by the solid before breakthrough (i.e. the time $t_p$ indicated in FIG. 1 discussed below), it being calculated using the following relationship:

$$q_s = M_s D_{H_2S}^E \int_0^{t_p} \left(1 - \frac{C_{H_2S}^S}{C_{H_2S}^E}\right) dt$$

in which:
$q_s$: the mass of sulphur captured by the solid (in g);
$D_{H_2S}^E$: the flow rate of incoming sulphur-containing compounds (in mol min$^{-1}$);
$M_s$: the molar mass of sulphur (in g·mol$^{-1}$)
$C_{H_2S}^E$: the quantity of sulphur-containing compounds in the incoming gas;
$C_{H_2S}^S$: the quantity of sulphur-containing compounds at the reactor outlet;
$t_p$: the time necessary for breakthrough of the sulphur-containing compounds (in min) as shown in FIG. 1.
In FIG. 1, $t_p$ is the breakthrough time and $t_f$ is the time at the end of breakthrough.

The sulphur capacity of the tested solid is given by the relationship:

$$C_S = q_S/m$$

where m is the mass of absorbant employed during the test.

The chlorination capacity of the mass of the invention is measured by the breakthrough test the conditions of which are given below. The test is carried out at a temperature of 30° C., at atmospheric pressure, and with an hourly space velocity (HSV) of 1600 h$^{-1}$. The gas used for the test is composed of 500 ppm H$_2$O and 500 ppm HCl in nitrogen. The quantity of HCl present in the gas at the reactor outlet which contains the capture mass used for the test, is determined by NaOH titration. The chlorination capacity of the capture masses of the invention is determined by carrying out a material balance. The chlorination capacity as defined in the context of the present invention corresponds to the quantity of chlorine accumulated by the solid after breakthrough (i.e. at time $t_f$ in FIG. 1), this being determined by calculating the quantity of HCl which has reacted with NaOH as well as by analysis of the solid after reaction.

The invention also concerns the use of the solid as described above as regards its composition and its production method.

The solid prepared using the process of the invention may be used to purify any gaseous or liquid feed containing, inter alia, sulphur-containing compounds such as H$_2$S, COS and/or CS$_2$. Said solid may also be employed to eliminate HCl present in the liquid or gaseous effluents.

The solid is used by bringing the gaseous feed into contact with said mass in a reactor, which may be either a fixed bed reactor or a radial reactor, or again a fluidized bed reactor.

In the context of the application concerning the desulphurization of gaseous or liquid feed, the conditions of use of said solid are preferably such that the pressure is in the range 0.1 to 25 MPa, preferably in the range 0.1 to 15 MPa, and the temperature is in the range 100° C. to 450° C.

The solid prepared in accordance with the invention may be used to purify gaseous feeds such as those used in co-generation units, in chemical synthesis units such as methanol synthesis units, or liquid feeds such as the hydrocarbons used as feeds in catalytic reforming, isomerization or hydrogenation units.

In the co-generation units, the synthesis gas is generally used at a pressure in the range 1 to 10 MPa, and at a temperature in the range 100° C. to 280° C.

Methanol is generally synthesized in the most recent processes at a pressure in the range 1 to 15 MPa, preferably in the range 5 to 10 MPa and at a temperature in the range 150° C. to 300° C., preferably in the range 220° C. to 280° C.

In particular, the solid prepared in accordance with the invention may advantageously be used to purify the feed from a Fischer-Tropsch synthesis unit, by using a reactor operating at a pressure which is generally in the range 0.1 to 15 MPa, preferably in the range 1.5 to 5.0 MPa, at a temperature which is usually in the range 150° C. to 400° C., preferably in the range 170° C. to 350° C.

In the context of the application concerning the elimination of halogenated compounds (for example dechlorination) from a gaseous or liquid feed, the conditions of use of said solid are preferably such that the pressure is in the range 0.1 to 10 MPa, preferably in the range 1 to 5 MPa, and the temperature is in the range 20° C. to 190° C.

The invention thus also concerns the use of a solid prepared using the preparation process of the invention to desulphurize a gas or a liquid, at a temperature in the range 100° C. to 450° C. and a pressure in the range 0.1 to 25 MPa.

It also concerns the use of solid prepared using the preparation process of the invention to eliminate halogenated compounds from a liquid or gaseous feed, at a temperature in the range 20° C. to 190° C., and at a pressure in the range 0.1 to 10 MPa.

EXAMPLES

Examples 1 and 2 (Comparative)

Capture masses with references 1 and 2 were prepared by mixing-extrusion using the following operating mode:
 a) pre-mixing powders comprising ZnO powder and binder in a mixer, by rotating the arms of said mixer;
 b) mixing the paste obtained by:
  i) bringing the pre-mixed powders and a solution containing nitric acid into contact, leading to the production of a paste (peptization);
  ii) mixing the paste in a mixer provided with a cam arm for 30 minutes at a rotation speed of 25 rpm;
 c) extruding the paste obtained in step b) using a piston extruder into 3 mm diameter cylinders with a length of 5 to 10 mm at a pressure which depends on the solids;
 d) drying the extrudates obtained in step c) at a temperature of 80° C. for a period of 15 hours;
 e) calcining at a temperature which varies depending on the examples for a period of 2 hours in a stream of air.

The capture mass 3 was prepared using the following operating mode:
 b) mixing step in which the ZnO and binder powders are brought into simultaneous contact by introducing them progressively into the nitric acid solution then by mixing it all until a paste was obtained (peptization). Next, the paste is mixed in the mixer provided with a cam arm for 30 minutes with an arm rotation rate of 25 rpm;
 c) extruding the paste obtained in step b) using a piston extruder into 3 mm diameter cylinders with a length of 5 to 10 mm at a pressure which varies depending on the solids;
 d) drying the extrudates obtained in step c) at a temperature of 80° C. for a period of 15 hours;
 e) calcining at a temperature which varies depending on the examples for a period of 2 hours in a stream of air.

A boehmite or clay type binder, depending on the case, was used for the examples.

The formulation for the solids is given in Tables 1 and 2. The quantity of ZnO was 70% or 95% by weight depending on the solids. The quantity of acid, $HNO_3$, was 2% by weight with respect to the quantity of ZnO introduced.

The mechanical strength of the extrudates was determined by a mechanical test of the average crush strength type as described above.

Example 1 (Comparative)

This example concerns the characteristics and performances of solids 1 and 2 in which a commercially available ZnO was used, the binder being a commercially available boehmite. The ZnO mass contents of solids 1 and 2 were respectively 70% and 95% by weight and the mass contents of the boehmite binder were respectively 30% and 5% by weight.

During extrusion, the pressure varied between 7.7 and 9.4 MPa for solid 1.

During extrusion, the pressure varied between 3.5 and 5.4 MPa for solid 2.

The extrudates were calcined for 2 h at 650° C.

TABLE 1

| Designation | ZnO content (%) | Binder | Quantity of $HNO_3$ (%) | Sulphur captured at $t_p$ (gS/gsolid) | ACS (daN · mm$^{-1}$) |
|---|---|---|---|---|---|
| Solid 1 | 70 | boehmite | 2 | 0.052 | 1.0 |
| Solid 2 | 95 | boehmite | 2 | 0.065 | 0.7 |

The increase in the ZnO content resulted in an increase in the sulphur absorption capacity, but also induced a deterioration in the mechanical strength properties for the capture masses in this operating mode. The mechanical strength of solid 2 is too low having regard to the constraints imposed by industrial use, and moreover, the sulphur absorption capacity was still mediocre despite the high ZnO content.

Example 2 (Comparative)

This example concerns the characteristics and performances of solid 3 in which a commercially available ZnO was used, the binder being a kaolinite type clay. The ZnO and clay mass contents of solid 3 were respectively 95% and 5% by weight.

During extrusion, the pressure varied between 3.8 and 5.6 MPa for solid 3.

The extrudates were calcined for 2 h at 500° C.

TABLE 2

| Designation | ZnO content (%) | Binder | Quantity of $HNO_3$ (%) | Sulphur captured at $t_p$ (gS/gsolid) | ACS (daN · mm$^{-1}$) |
|---|---|---|---|---|---|
| Solid 3 | 95 | clay | 2 | 0.053 | 0.6 |

The sulphur capacity of the solid was still low compared with that of the solids of the invention.

Examples 3 to 8 (in Accordance with the Invention)

In Examples 3 to 8, the solids of the invention were prepared using the following operating mode:
 a) pre-mixing powders comprising ZnO powder and binder in a mixer, by rotating the arms of said mixer;

b) mixing a paste obtained by:
   i) bringing the pre-mixed powders and a solution containing a peptizing agent, optionally supplemented with an inorganic compound into contact, leading to the production of a paste (peptization);
   ii) mixing the paste in a mixer provided with a cam arm for 30 minutes at an arm rotation speed of 25 rpm;
c) extruding the paste obtained in step b) using a piston extruder into 3 mm diameter cylinders with a length of 5 to 10 mm at a variable pressure depending on the solids;
d) drying the extrudates obtained in step b) in air at a temperature of 80° C. for a period of 15 hours;
e) calcining at a temperature which varies depending on the examples for a period of 2 hours, in a stream of air.

A boehmite or clay type binder, depending on the case, was used for the examples.

The nature of the peptization solution employed varied depending on the examples.

The formulation of solids 4 to 8 corresponded to 95% by weight of ZnO and 5% by weight of binder.

Solid 9 was prepared using the same operating mode, with the quantity of ZnO employed being 58% by weight with respect to the total mass of solid.

The mechanical strength of the extrudates was determined by a mechanical average crush strength test as described above.

Example 3 (Invention)

This example concerns the properties of solid 4 for which the same commercially available ZnO employed in the preceding examples was used, and the binder was a commercially available boehmite.

Peptization was carried out using a solution of sodium hydroxide NaOH, the quantity of NaOH base being expressed with respect to the mass of ZnO introduced and being fixed at 2% by weight. For this reason, the quantity of sodium ion $Na^+$ was 1.2% by weight with respect to the quantity of ZnO introduced.

The extrusion pressure was in the range 5.0 to 8.0 MPa.
The extrudates were calcined for 2 h at 650° C.

TABLE 3

| Designation | ZnO content (%) | Binder | Quantity of NaOH (%) | Quantity of $Na^+$ (%) | Sulphur captured at $t_p$ (gS/gsolid) | ACS (daN·$mm^{-1}$) |
|---|---|---|---|---|---|---|
| Solid 4 | 95 | boehmite | 2 | 1.2 | 0.107 | 1.1 |

Example 4 (Invention)

This example concerns the properties of solid 5 for which a commercially available ZnO was used; the binder was a kaolinite type clay.

Peptization was carried out using a solution of sodium hydroxide NaOH, the quantity of NaOH base being expressed with respect to the mass of ZnO introduced and being fixed at 4% by weight. For this reason, the quantity of sodium ion $Na^+$ was 2.4% by weight with respect to the quantity of ZnO introduced.

During extrusion, the pressure varied between 5.0 and 8.0 MPa.
The extrudates were calcined for 2 h at 500° C.

TABLE 4

| Designation | ZnO content (%) | Binder | Quantity of NaOH (%) | Quantity of $Na^+$ (%) | Sulphur captured at $t_p$ gS/(gsolid) | ACS (daN·$mm^{-1}$) |
|---|---|---|---|---|---|---|
| Solid 5 | 95 | Clay | 4 | 2.4 | 0.142 | 1.1 |

Example 5 (Invention)

This example concerns the properties of solid 6 for which a commercially available ZnO was used; the binder was a boehmite.

Peptization was carried out using a solution of sodium hydroxide NaOH, the quantity of NaOH base being expressed with respect to the mass of ZnO introduced and being fixed at 4% by weight. For this reason, the quantity of sodium ion $Na^+$ was 2.4% by weight with respect to the quantity of ZnO introduced.

During extrusion, the pressure varied between 5.3 and 6.5 MPa.
The extrudates were calcined for 2 h at 500° C.

TABLE 5

| Designation | ZnO content (%) | Binder | Quantity of NaOH (%) | Quantity of $Na^+$ (%) | Sulphur captured at $t_p$ gS/(gsolid) | ACS (daN·$mm^{-1}$) |
|---|---|---|---|---|---|---|
| Solid 6 | 95 | boehmite | 4 | 2.4 | 0.123 | 1.1 |

Example 6 (Invention)

This example concerns the properties of solid 7 for which a commercially available ZnO was used; the binder was a kaolinite type clay.

Peptization was carried out using a basic ammoniacal solution, the quantity of $NH_4OH$ base being expressed with respect to the mass of ZnO introduced and being fixed at 2% by weight.

During extrusion, the pressure varied between 6.0 and 7.5 MPa.
The extrudates were calcined for 2 h at 500° C.

TABLE 6

| Designation | ZnO content (%) | Binder | Quantity of $NH_4OH$ (%) | Sulphur captured at $t_p$ (gS/gsolid) | ACS (daN·$mm^{-1}$) |
|---|---|---|---|---|---|
| Solid 7 | 95 | clay | 2 | 0.130 | 1.1 |

Example 7 (Invention)

This example concerns the properties of solid 8 for which a commercially available ZnO was used; the binder was a kaolinite type clay.

Peptization was carried out using an acidic $HNO_3$ solution supplemented with sodium nitrate. The quantity of $HNO_3$ was 3% by weight with respect to the quantity of ZnO introduced. The dopant was the sodium ion $Na^+$; the quantity introduced during peptization was 2% by weight with respect to the dry ZnO mass.

During extrusion, the pressure varied between 4.5 and 7.0 MPa.

The extrudates were calcined for 2 h at 500° C.

TABLE 7

| Designation | ZnO content (%) | Binder | Quantity of $HNO_3$ (%) | Quantity of $Na^+$ (%) | Sulphur captured at $t_p$ (gS/gsolid) | ACS (daN·$mm^{-1}$) |
|---|---|---|---|---|---|---|
| Solid 8 | 95 | clay | 3 | 2 | 0.125 | 1.2 |

These examples illustrate the scope of the invention without in any way limiting it and emphasize the contribution made by the operating mode of the invention to the performances of the capture masses. The sulphur absorption capacities of the solids of the invention described in for examples 3 to 7 are better than the capacity of the solids prepared using the conventional operating mode described in Examples 1 and 2, while having mechanical properties which are 0.9 daN·$mm^{-1}$ or higher, allowing them to be used in a fixed bed reactor.

Example 8 (Invention)

This example concerns the properties of solid 9 for which a commercially available ZnO was used; two binders, boehmite and clay, were used. The quantity of boehmite used to form the solid here was 39% by weight with respect to the total mass of the sample, and the quantity of kaolinite type clay was 3% by weight.

Peptization was carried out using a nitric acid solution, the quantity of acid $HNO_3$, expressed with respect to the mass of ZnO introduced, was fixed at 1.3% by weight.

The quantity of $Na^+$ introduced during peptization was 0.1% by weight with respect to the dry ZnO mass.

During extrusion, the pressure varied between 6.0 and 7.5 MPa.

The extrudates were calcined for 2 h at 700° C.

TABLE 8

| Designation | ZnO content (%) | Binders | Quantity of $HNO_3$ (%) | Quantity of $Na^+$ (%) | Chlorine captured at $t_f$ (gCl/gsolid) | ACS (daN·$mm^{-1}$) |
|---|---|---|---|---|---|---|
| Solid 9 | 58 | 39% boehmite + 3% clay | 2 | 0.1 | 0.26 | 1.3 |

The chlorine capacity of solid 9 was particularly high, being equal to 0.26 gCl/solid, which corresponded to a weight capacity of 26% under the breakthrough test conditions.

The invention claimed is:

1. A process for preparing a solid comprising ZnO and a binder, said process comprising:
    a) pre-mixing powders comprising at least one ZnO powder and at least one binder;
    b) forming a paste by:
        i) bringing the pre-mixed powders and a solution containing a peptizing agent into contact, leading to the production of a paste;
        ii) mixing the paste;
    c) extruding the paste obtained in b) at a pressure in the range 3 to 10 MPa to form extrudates:
    d) drying the extrudates obtained in c) at a temperature in the range 70° C. to 160° C. for a period in the range 1 to 24 hours;
    e) calcining the dried extrudates at a temperature in the range 200° C. to 800° C. for a period in the range 1 to 6 hours, in a gaseous stream comprising oxygen;
    and in which the peptizing agent used in b) is sodium hydroxide, potassium hydroxide, ammonia or an organic base.

2. The preparation process according to claim 1, in which peptization is carried out using a solution containing peptizing agent and at least one dopant.

3. The process according to claim 2, in which the dopant is an alkali ion or an alkaline-earth ion, or a transition metals.

4. The process according to claim 2, in which the dopant is an alkali ion or an alkaline-earth ion.

5. The process according to claim 1, in which the peptization is carried out using an aqueous solution jointly containing a peptizing agent and a compound containing a mineral doping element or using a composition having a dual dopant/peptization effect.

6. The process according to claim 1, in which the peptizing agent used in step a) is sodium hydroxide and the ratio of the quantity of sodium hydroxide/quantity of ZnO is in the range 1% to 10% by weight.

7. The process according to claim 1, in which the binder used in a) is alumina or a boehmite.

8. The process according to claim 1, wherein the peptizing agent in b) is an amine or a quaternary ammonium compound.

* * * * *